US012644337B2

(12) United States Patent
Leines

(10) Patent No.: US 12,644,337 B2
(45) Date of Patent: Jun. 2, 2026

(54) PORTABLE STAIRCASE

(71) Applicant: MA Staircase LLC, Camden, DE (US)

(72) Inventor: Torsten Leines, Maple Grove, MN (US)

(73) Assignee: MA Staircase LLC, Paracorp Incorporated, Camden, DE (US)

( * ) Notice: Subject to any disclaimer, the term of this patent is extended or adjusted under 35 U.S.C. 154(b) by 267 days.

(21) Appl. No.: 18/113,471

(22) Filed: Feb. 23, 2023

(65) Prior Publication Data

US 2023/0258041 A1 Aug. 17, 2023

Related U.S. Application Data

(62) Division of application No. 16/779,031, filed on Jan. 31, 2020, now Pat. No. 11,591,854.

(60) Provisional application No. 62/799,346, filed on Jan. 31, 2019.

(51) Int. Cl.

*E06C 5/06* (2006.01)
*E06C 5/34* (2006.01)
*E06C 5/42* (2006.01)
*E06C 5/16* (2006.01)

(52) U.S. Cl.

CPC .................. *E06C 5/06* (2013.01); *E06C 5/34* (2013.01); *E06C 5/42* (2013.01); *E06C 5/16* (2013.01)

(58) Field of Classification Search

CPC ..... E06C 5/04; E06C 5/06; E06C 5/34; E06C 5/42; E06C 5/16; E06C 1/12; B66F 11/00; B66F 11/04; B66F 11/046; B64F 1/315; B63B 27/14

See application file for complete search history.

(56) References Cited

U.S. PATENT DOCUMENTS

| | | | | | |
|---|---|---|---|---|---|
| 141,126 | A * | 7/1873 | Eagon | E06C 7/42 182/208 |
| 237,616 | A * | 2/1881 | Sherwood, Jr. | E06C 1/397 182/67.1 |
| 237,618 | A | 2/1881 | Smith | |
| 986,953 | A * | 3/1911 | Soule | E04G 1/24 182/180.1 |
| 1,162,413 | A * | 11/1915 | Sperling | E06C 5/04 182/208 |
| 2,186,119 | A * | 1/1940 | Moen | E06C 1/22 182/208 |
| 2,531,001 | A * | 11/1950 | Short | B64F 1/28 182/1 |
| 2,777,737 | A * | 1/1957 | Balogh | B66F 11/044 182/1 |
| 2,969,123 | A * | 1/1961 | Jamerson | B25H 5/00 182/127 |

(Continued)

*Primary Examiner* — Daniel P Cahn
*Assistant Examiner* — Shiref M Mekhaeil
(74) *Attorney, Agent, or Firm* — Dicke, Billig & Czaja PLLC

(57) ABSTRACT

The disclosure relates to portable staircases having a staircase assembly including an outer staircase and an inner staircase that can move in a telescoping relationship with respect to the outer staircase. Portable staircases of the disclosure are particularly useful for accessing an oil drilling rig as they are independently supported with respect to the drilling rig, thus providing numerous safety improvements and advantages. Methods of using the portable staircases of the disclosure are also disclosed.

7 Claims, 14 Drawing Sheets

(56) References Cited

U.S. PATENT DOCUMENTS

| | | | | | |
|---|---|---|---|---|---|
| 3,259,369 | A * | 7/1966 | Gridley | B66F 7/0666 | 187/269 |
| 3,396,814 | A * | 8/1968 | Garnett | B66F 11/046 | 182/2.11 |
| 3,534,868 | A * | 10/1970 | Eitel | B66F 11/046 | 182/2.11 |
| 3,664,458 | A * | 5/1972 | Sterns | E06C 1/39 | 182/180.2 |
| 3,691,366 | A * | 9/1972 | Spreuer | B60Q 1/305 | 362/253 |
| 3,891,108 | A * | 6/1975 | Traficant | B66F 7/08 | 414/495 |
| 3,948,353 | A * | 4/1976 | Lane | E06C 7/48 | 182/206 |
| 3,999,628 | A * | 12/1976 | Parson | E06C 7/00 | 182/129 |
| 4,094,381 | A * | 6/1978 | Wilkerson | E06C 5/04 | 182/208 |
| 4,457,403 | A * | 7/1984 | Ream | B66F 11/042 | 187/244 |
| 4,632,220 | A * | 12/1986 | Murrell | E06C 7/44 | 182/172 |
| 4,676,713 | A * | 6/1987 | Voelpel | B66F 9/181 | 901/29 |
| 5,040,257 | A * | 8/1991 | Bentz | B64F 1/315 | 14/71.1 |
| 5,139,108 | A * | 8/1992 | Pate | E06C 7/12 | 182/108 |
| 5,145,029 | A * | 9/1992 | Blasdell, Jr. | E04G 1/22 | 182/69.5 |
| 5,222,717 | A * | 6/1993 | Traficant | B66F 7/08 | 254/122 |
| 5,279,389 | A * | 1/1994 | Crockett | E06C 7/48 | 182/129 |
| 5,295,555 | A * | 3/1994 | Strange | E06C 5/04 | 182/127 |
| 5,411,111 | A * | 5/1995 | Greve | E06C 1/397 | 182/116 |
| 5,634,529 | A * | 6/1997 | Nguyen | E06C 5/06 | 182/63.1 |
| 5,857,544 | A * | 1/1999 | Del Sole | E06C 7/42 | 182/180.2 |
| 6,053,284 | A * | 4/2000 | Fountain | E06C 7/42 | 182/180.2 |
| 6,467,576 | B2 * | 10/2002 | Figura | E06C 7/186 | 182/2.5 |
| 6,755,258 | B1 * | 6/2004 | Hunke | A62C 27/00 | 169/24 |
| 7,448,470 | B2 * | 11/2008 | Brown | B66F 11/042 | 182/69.5 |
| 9,085,936 | B2 * | 7/2015 | Mosier | E06C 5/04 | |
| 9,109,394 | B2 * | 8/2015 | Hernandez | E06C 5/04 | |
| 9,302,129 | B1 * | 4/2016 | Betz | B62D 21/09 | |
| 9,757,601 | B2 * | 9/2017 | Lenz, Jr. | A62C 27/00 | |
| 9,803,422 | B2 * | 10/2017 | Johnson | E06C 1/397 | |
| 10,156,080 | B1 * | 12/2018 | Speaks | B63B 17/00 | |
| 10,532,827 | B2 * | 1/2020 | Springer | E06C 5/04 | |
| 10,617,900 | B1 * | 4/2020 | Linsmeier | B66F 11/046 | |
| 11,814,193 | B2 * | 11/2023 | Springer | E06C 1/397 | |
| 2006/0169536 | A1 * | 8/2006 | Davis | E06C 5/04 | 182/127 |
| 2007/0051559 | A1 * | 3/2007 | Brown | B66F 11/042 | 182/63.1 |
| 2009/0301813 | A1 * | 12/2009 | Chantelois | E06C 5/10 | 182/64.1 |
| 2011/0070054 | A1 * | 3/2011 | Crossley | E21B 19/14 | 414/800 |
| 2011/0253476 | A1 * | 10/2011 | Earl | B66F 7/02 | 182/69.6 |
| 2012/0030887 | A1 * | 2/2012 | Corboy | B63B 27/14 | 14/71.3 |
| 2014/0041963 | A1 * | 2/2014 | O'Shea | E06C 7/16 | 182/64.1 |
| 2014/0097042 | A1 * | 4/2014 | Wright | E06C 7/02 | 182/208 |
| 2017/0167196 | A1 * | 6/2017 | Johnson | E06C 1/397 | |
| 2017/0283229 | A1 * | 10/2017 | Shi | B66F 11/042 | |
| 2017/0292349 | A1 * | 10/2017 | Toma | E04G 1/24 | |
| 2018/0155885 | A1 * | 6/2018 | Hessels | E01D 15/127 | |
| 2019/0048605 | A1 * | 2/2019 | Masterson | E06C 1/36 | |
| 2019/0242194 | A1 * | 8/2019 | Toma | B62D 55/04 | |

* cited by examiner

PORTABLE STAIRCASE

CROSS-REFERENCE TO RELATED APPLICATIONS

This application is Divisional application of U.S. application Ser. No. 16/779,031, filed Jan. 31, 2020, now allowed, entitled "PORTABLE STAIRCASE" which claims the benefit of the filing date of U.S. Provisional Application Ser. No. 62/799,346, filed Jan. 31, 2019, entitled "PORTABLE STAIRCASE" the entire teachings of which are incorporated herein by reference.

BACKGROUND

Drilling rigs are known and used for identifying geologic reservoirs of natural resources, such as oil, for example, and also to create holes that allow the extraction of natural resources from those reservoirs. The extraction process begins by positioning the drilling rig over the site to be drilled. Drilling rigs can be mobile and driven from site to site or can also be more permanent structures positioned over the drilling site.

The process begins by drilling a hole deep into the Earth. A long drill bit attached to a section of "drilling string" is used for this purpose. After each section is drilled, a steel pipe slightly smaller than the hole diameter is dropped in and often cement is used to fill the outer gap. The steel pipe is called a casing and provides structural integrity to the drilled hole. As the drill bit progresses deeper, additional sections of pipe need to be added to the drilling string to allow the drill bit to move further into the Earth. Typically, workers standing on the drilling rig take the additional sections of pipe, one by one, and screw them onto the drilling string, as needed. The additional sections of pipe are delivered to the site and then raised one by one to the workers with a crane. Currently, oil rigs are often accessed by workers from the ground with a step ladder.

The present disclosure addresses problems and limitations with the related art.

SUMMARY

The present inventor has discovered many drawbacks associated with current methods of accessing a drilling rig. For example, using step ladders to climb to a drilling rig is problematic as the height of drilling rigs keeps increasing and thus, longer and longer step ladders are required. In addition, a step ladder resting against the drilling rig is generally unstable and can fall both during user ascent or descent and can additionally slide or fall due to movement of the drilling rig, creating substantial safety risks to those on the ladder or needing to exit the drilling rig in the case of an emergency.

Aspects of the disclosure relate to a portable staircase having a staircase assembly including an outer staircase and an inner staircase that can move in a telescoping relationship with respect to the outer staircase. The portable staircase includes a trailer for transporting the staircase assembly as well as hydraulic lift assemblies for lifting the staircase assembly to increase an angle between the staircase assembly and the ground and also to extend the inner staircase with respect to the outer staircase. Methods of using the portable staircases of the disclosure are also disclosed. In one method, the portable staircase is transported to and used to access an oil drilling rig. In such methods, the portable staircase is independently supported with respect to the oil drilling rig, thus providing numerous safety improvements and other advantages.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. Like reference numerals designate corresponding similar parts. Various components may be omitted in the certain drawings for ease of illustration.

DETAILED DESCRIPTION

Figure 1:
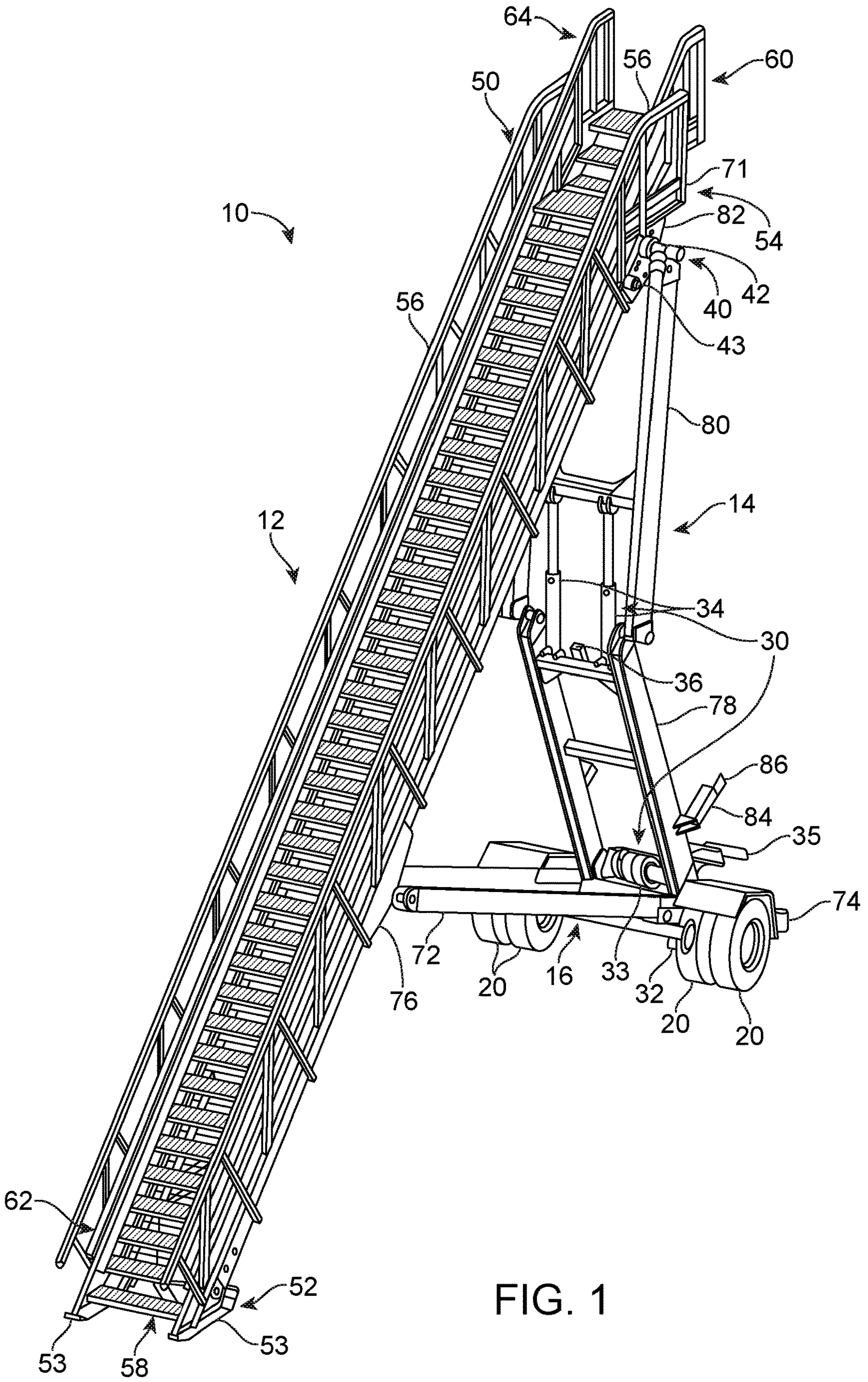
FIG. 1 is a perspective view of a portable staircase having a staircase assembly including an inner staircase and an outer staircase.
Figure 2:
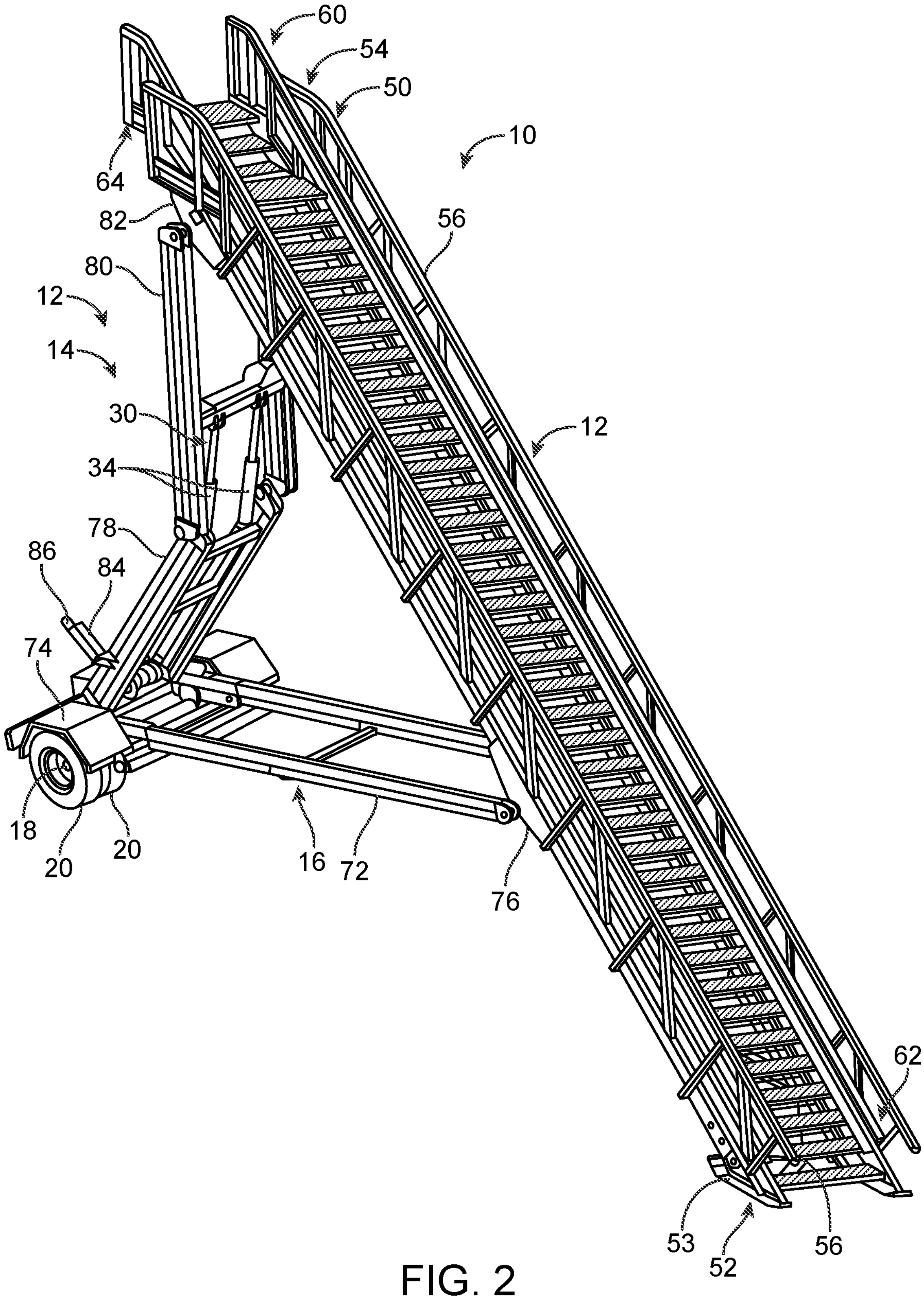
FIG. 2 is a second perspective view of the portable staircase of FIG. 1.
Figure 3:
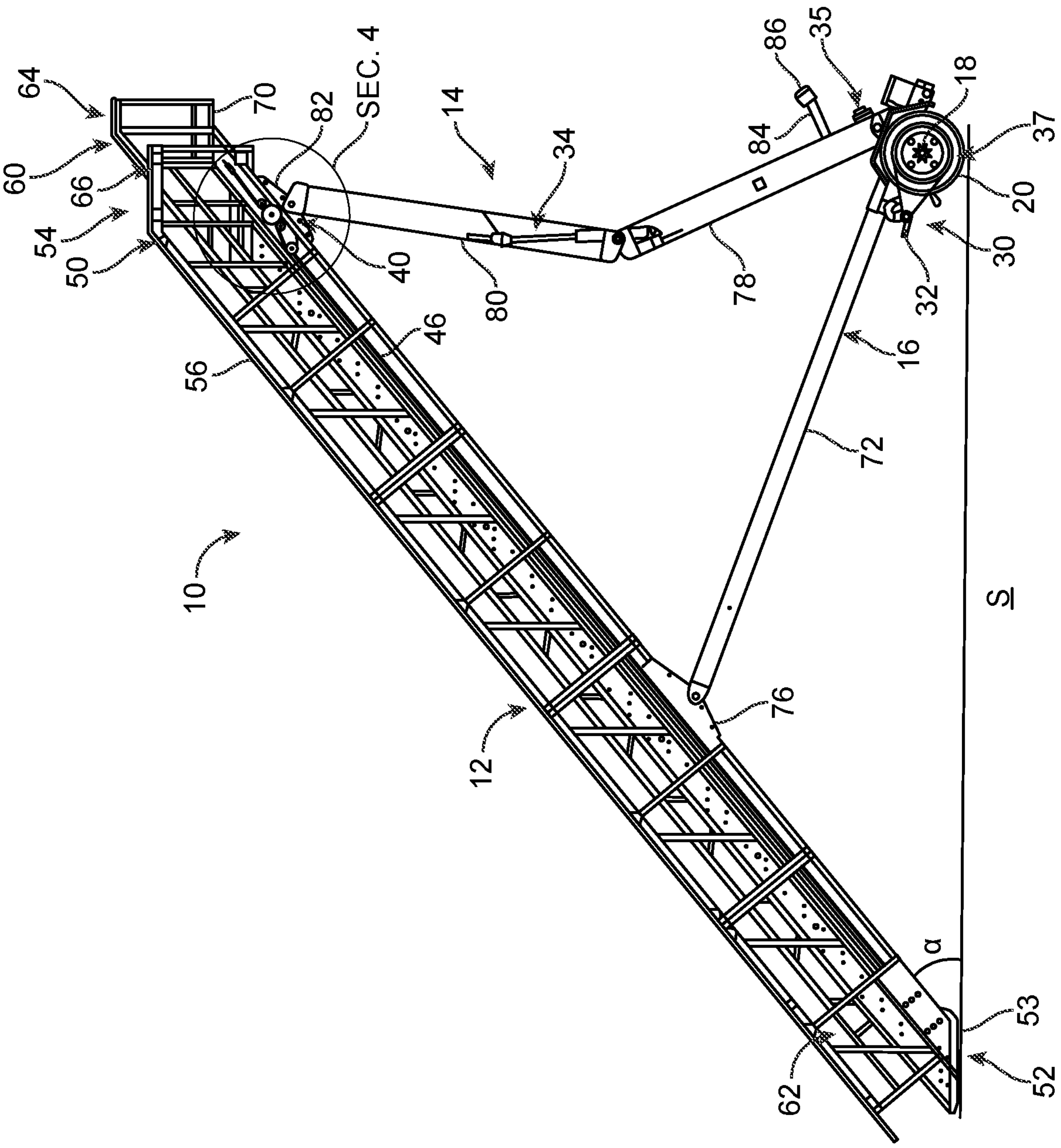
FIG. 3 is a side view of the portable staircase of FIGS. 1-2.
Figure 4:
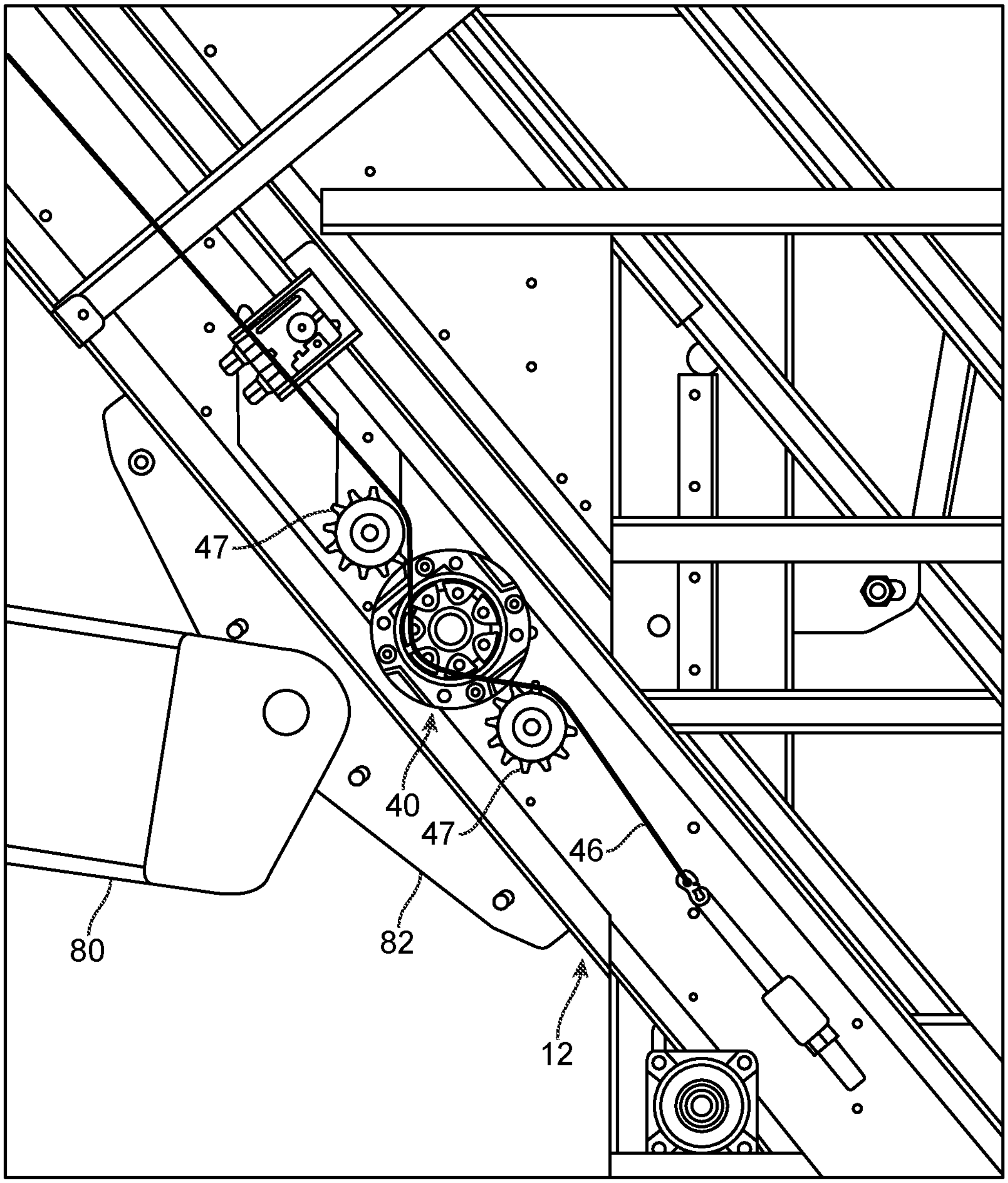
FIG. 4 is an enlarged view of SEC. 4 of FIG. 3.
Figure 6:
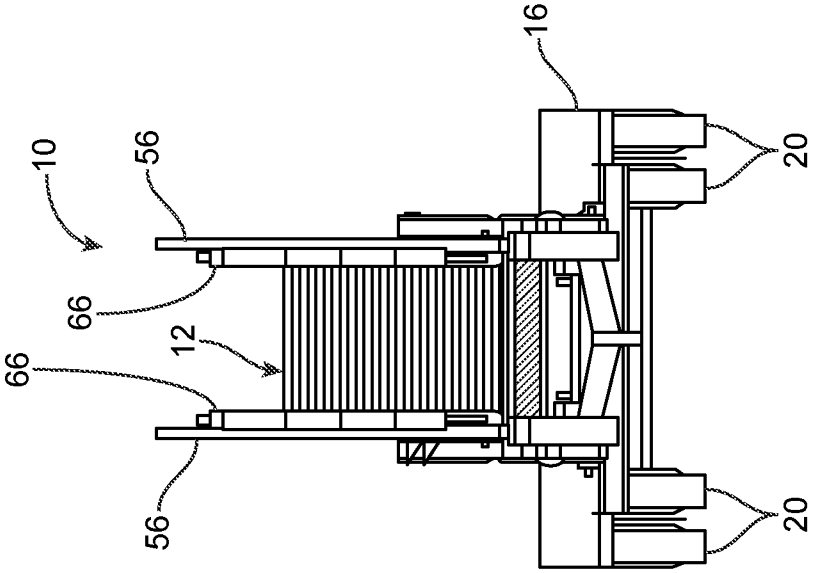
FIG. 6 is a front end view of the portable staircase of FIGS. 1-4.
Figure 5:
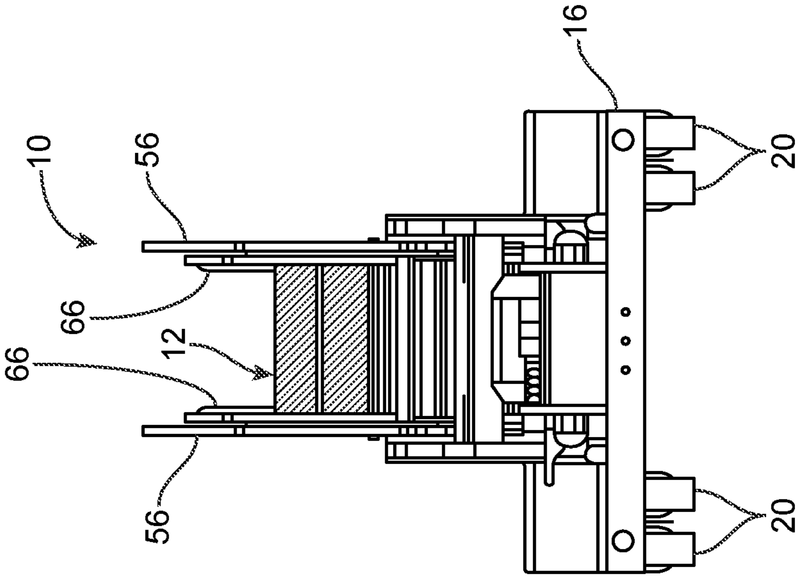
FIG. 5 is a rear end view of the portable staircase of FIGS. 1-4.

In the following detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

As indicated above, current methods in which workers access a landing or platform of an oil rig include using step ladders. The present inventor has discovered many drawbacks to such methods and the use of step ladders for the purpose of accessing and exiting from a drilling rig. For one, step ladders are not stable and can slide during use. In addition, should the drilling rig shake or move unexpectedly, the ladder will likely fall to the ground, thereby preventing workers from safely exiting down to the ground via the ladder. Also, modern drilling rigs keep getting taller and taller, requiring longer and longer step ladders. Portable staircases of the disclosure provide safety improvements over known devices. Portable staircases of the disclosure are freestanding with respect to the drilling rig so that, generally, movement of the drilling rig will not affect the position of the portable staircase. In other words, portable staircases of the disclosure are independently supported with respect to the drilling rig. In this way, the portable staircase will not unintentionally shake, slide or drop due to movement of the drilling rig, which is believed to dramatically increase workplace safety for workers on the drilling rig.

An example of one portable staircase 10 of the disclosure is collectively illustrated in FIGS. 1-12. The portable staircase 10 includes a staircase assembly 12 positioned on a trailer 14 having a frame 16 supporting at least one axle 18 with at least two wheels 20. In one example embodiment, the portable staircase 10 includes four wheels 20 provided in a linear arrangement, two wheels 20 on each side of the frame 16. The trailer 14 can also include a hitch 15 for securing to a vehicle (not shown) that can drive the portable staircase 10 to the job site (e.g., an oil drilling rig). In some embodiments, the trailer 14 includes a light bar 22 that can support one or more lights to provide for visibility during transport. In some embodiments, the light bar 22 can be telescoping so that it can be retracted when the portable staircase 10 is not in transport (see, e.g., FIGS. 8-9).

Figure 8:
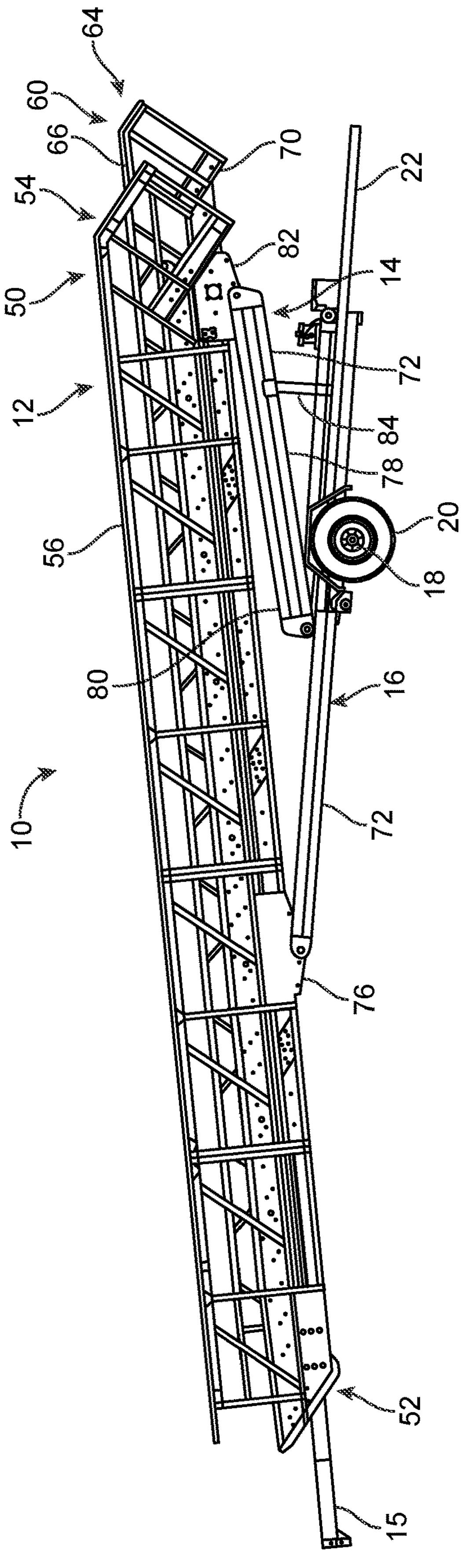
FIG. 8 is a side view of the portable staircase of FIG. 1 in a transport and retracted arrangement, wherein a hitch of the portable staircase is in an extended position.
Figure 9:
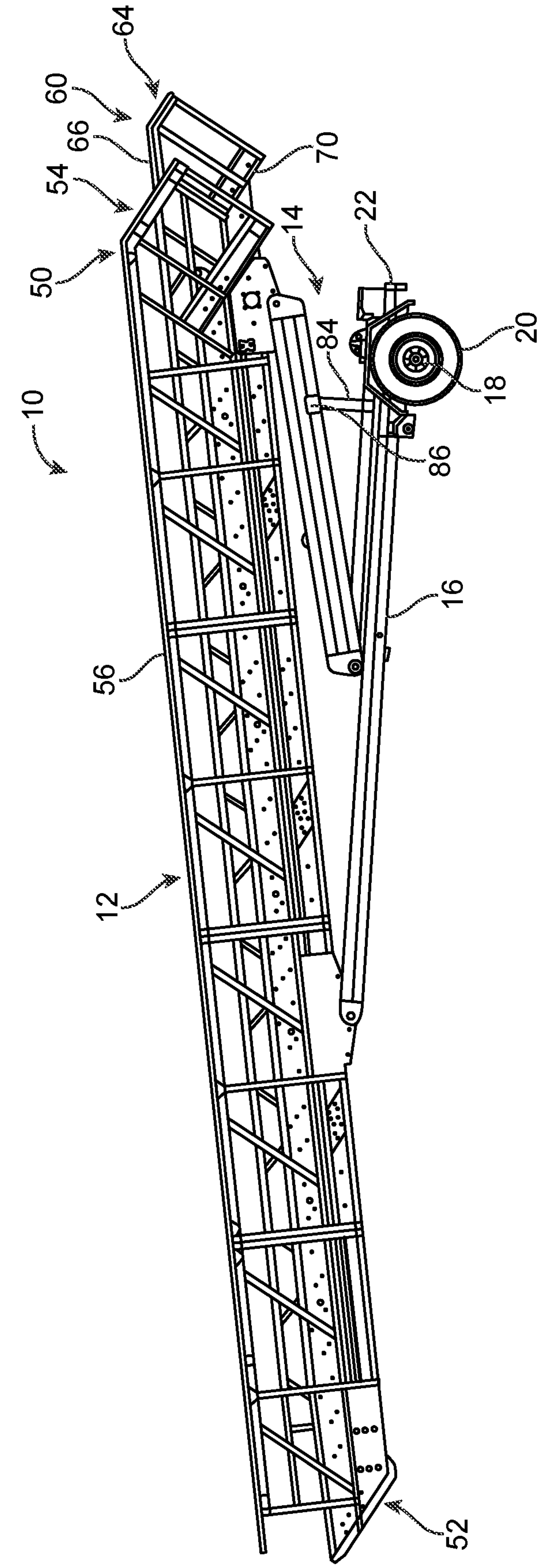
FIG. 9 is a side view of the hitch of FIG. 8 in a retracted position.
Figure 11:
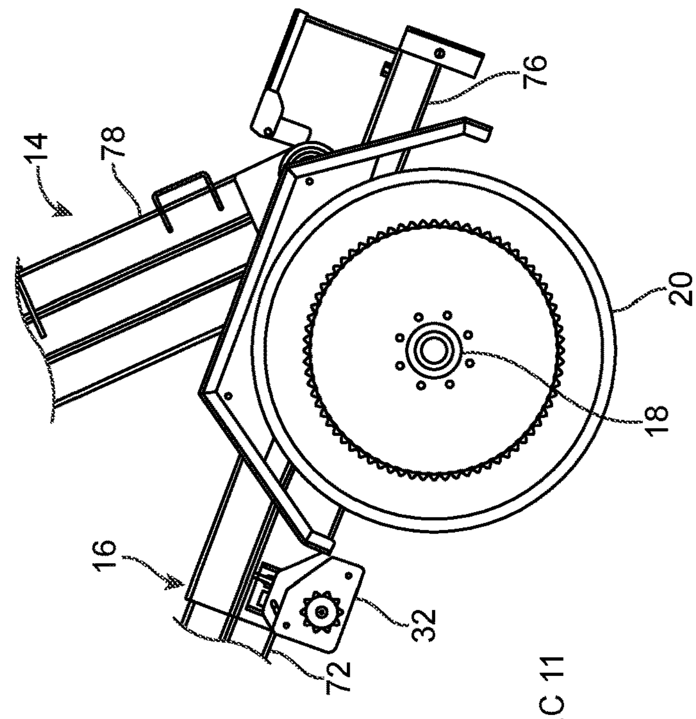
FIG. 11 is an enlarged view of SEC. 11 of FIG. 10.
Figure 10:
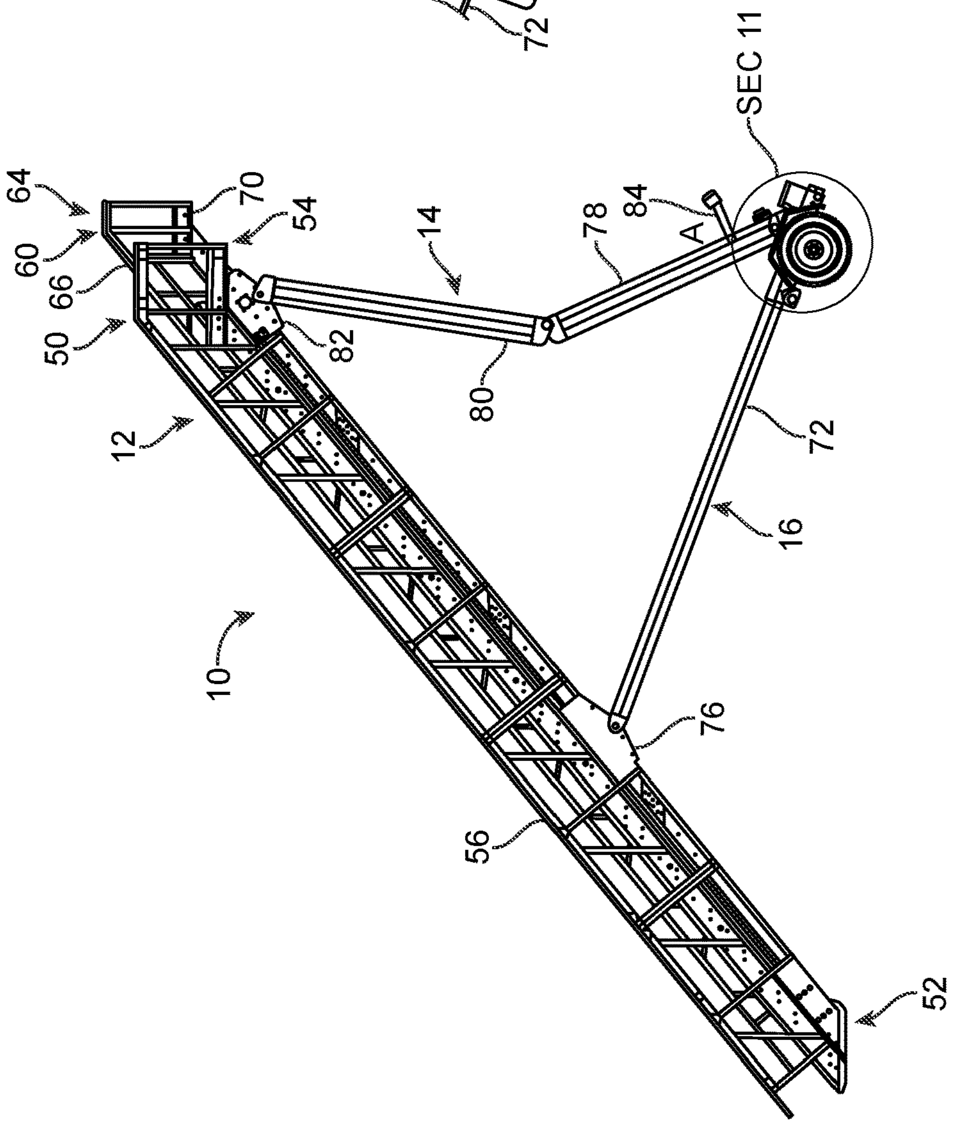
FIG. 10 is a side view of the portable staircase of FIG. 8 in a raised arrangement wherein the inner staircase is fully retracted in the retracted arrangement within the outer staircase.

The frame 16 further supports a first hydraulic lift assembly 30 operatively configured to lift the staircase assembly 12 from a transport arrangement of FIG. 8 to a fully raised arrangement of FIG. 10 and any partially raised arrangement there between. The hydraulic lift assembly 30 incudes a hydraulic motor 32, hydraulic power unit 33, one or more hydraulic cylinders 34, hydraulic valve 35 and counterbalance valve 36. In one example embodiment, the hydraulic cylinders 34 can be the type having the following specifications: 4 inch bore, 24 inch stroke, 34 inch retracted and 1.5 inch pin diameter. The hydraulic motor 32 drives a chain transmission 37 which is coupled to a sprocket on axles 18. This allows the operator to move the staircase assembly in a desired position without external equipment.

The staircase assembly 12 includes an outer staircase 50 interconnected to a telescoping inner staircase 60. The outer staircase 50 has a first end 52, a second end 54, opposing outer railing assemblies 56 and a plurality of steps 58 (generally referenced for ease of illustration). The first end 52 can optionally include stabilizing skid pads 53 to support the staircase assembly 12 on a surface S (shown in select figures). A support base 59 can be provided at the first end 52. The inner staircase 60 has a first end 62, a second end 64, opposing inner railing assemblies 66 and a plurality of steps 68 (generally referenced for ease of illustration). As can be seen in a comparison of FIGS. 8 and 10, the inner staircase 60 is configured such that the inner staircase 60 can selectively be positioned in a retracted arrangement in which the inner staircase 60 is at least partially positioned on top of and substantially overlapping the outer staircase 50 (FIG. 8). The staircase assembly 12 also includes the partially extended arrangement in which the inner staircase 60 is at least partially extended past and partially overlaps with the outer staircase 50. In the fully extended arrangement (FIG. 10), the second end 64 of the inner staircase 60 extends its maximum distance from the outer staircase 50 and may or may not partially overlap with the outer staircase 50. To achieve the aforementioned arrangements of the inner staircase 60 with respect to the outer staircase 50, the inner staircase 60 has a width that is less than a width of the outer staircase 50 so that the inner staircase 60 can move in a telescoping fashion with respect to the outer staircase 50. In some embodiments, the second end 64 of the inner staircase can include a platform 70 that defines an area greater than an area of one stair of the plurality of stairs or steps 68.

The railing assemblies 66 of the inner staircase 60 each include a top track 90*a* and a bottom track 90*b*. The inner staircase 60 and railing assemblies 66 are connected together at the inner staircase platform 70. Cam rollers 92 are connected to the inner staircase 60 on the bottom end 62. The outer staircase 50 includes two sets of tracks 94, 96 that each comprise top and bottoms on left and right sides of the inner staircase 60. One set of tracks 94 constrain railing assembly 66 and configured to resemble C-shaped channels. The inner railing assemblies 66 slide along the sets of C-channel tracks 96 at the inner staircase 60 moves with respect to the outer staircase 50. The other set of tracks 96 constrain a frame supporting the steps 68 of the inner staircase 60 and are configured to resemble L-angle irons. The cam rollers 92 help reduce friction between the inner staircase 60 and the outer staircase 50 tracks 96 to allow smooth extension and retraction of the inner staircase 60. A roller 98 connected on outer staircase platform 71 supports the inner staircase 60 on the upper end of the outer staircase 50 while reducing sliding friction between the inner and outer staircases 50, 60.

To actuate movement of the inner staircase 60 with respect to the outer staircase 50, the staircase assembly 12 includes a second hydraulic lift assembly 40. The second hydraulic lift assembly 40 is configured to extend and lower the inner staircase 60 from the outer staircase 50. The second hydraulic lift assembly 40 includes a hydraulic motor with brake 42 and counterbalance valve 43. In one example embodiment, the hydraulic motor with brake—42 is model numbers 95C4A3B098W (Brake) CK18-0360; TB0195FS100AAAA all available from Parker Hannifin Corp. of Mayfield Heights, Ohio. A chain 46 extends within the staircase assembly 12 and is engaged around a plurality of gears 47, the gears 47 being positioned linearly on opposing sides of the hydraulic motor with brake 42 along the staircase assembly 12. Although not referenced, the chain 46 can include a plurality of apertures through which teeth of the gears are inserted. The chain 46 is configured such that the hydraulic motor with brake 42 can be actuated to extend and raise the inner staircase 60 with respect to the outer staircase 50 with the chain 46. The hydraulic motor with brake 42 is also used to retract the inner staircase 60 back into the outer staircase 50. The brake function of 42 can be used to just hold the inner staircase 60 in place if 42 loses hydraulic pressure. The brake function of 42 serves as a safety feature and to provide controlled operation up and down.

In one embodiment, each railing assembly 56 of the outer staircase 50 includes a plurality of supports extending from an upper rail to a lower rail, wherein the lower rail extends below the plurality of stairs or steps 58. Each railing assembly 56 can also include a platform extension at the second end 54 of the outer staircase 50. The platform extension 71 can be configured to be parallel with a plane defined by the platform 70 of the inner staircase 60. In this embodiment, each railing assembly 66 of the inner staircase 60 includes a plurality of supports extending between an upper rail and a lower rail, however, the railing is positioned entirely above the plurality of stairs of both the upper staircase 60 and the lower staircase 50. Proximate the platform 70, the railing 66 can be oriented parallel with respect to the plane defined by the platform 70. The railing assemblies 56, 66 can take other configurations, as desired.

Figure 7:
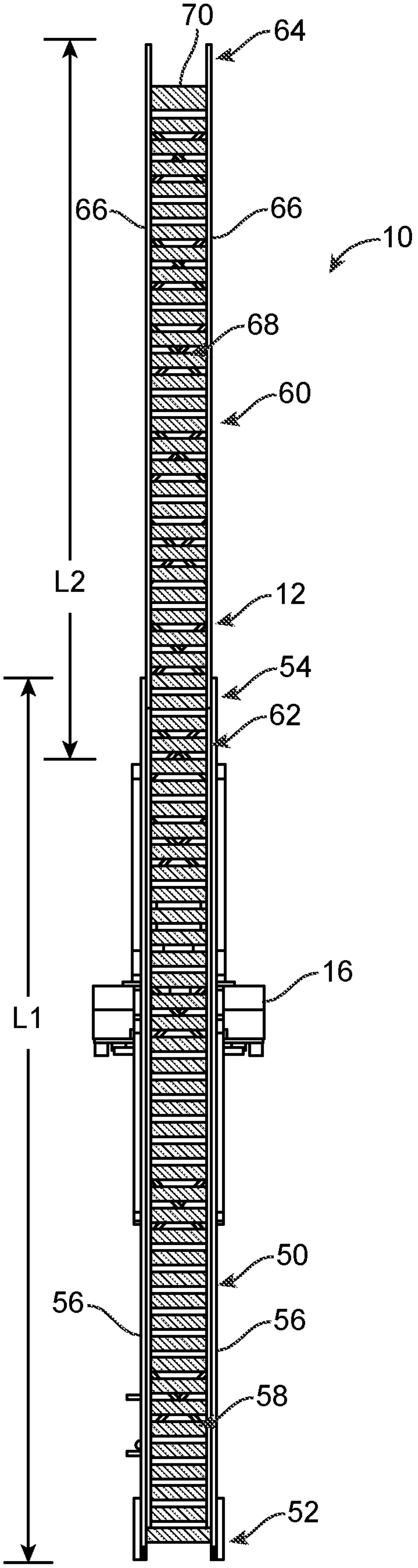
FIG. 7 is a top view of the portable staircase of FIGS. 1-4 and 5-6.

Referring now in particular to FIG. 7, in one embodiment the outer staircase 50 has a length L1 between 12 and 60 feet and the inner staircase 60 has a length L2 between 12 and 60 feet.

As can be seen, the first hydraulic lift assembly 30 allows for adjustment of an angle α (FIGS. 3 and 12) between the staircase assembly 12 and a surface S on which the portable staircase 12 is positioned to be adjusted (i.e. increased or decreased). For example, the first hydraulic lift assembly 30 is configured to allow for the angle α to increase from the orientation of FIG. 8 to the orientation of FIG. 10, which correspondingly lifts the staircase assembly 12 to a drilling rig R or the like so that a user U can climb from the surface S, proximate the outer staircase 50 up to the drilling rig R, proximate the inner staircase 60 along the plurality of steps 58, 68.

The first hydraulic lift assembly 30 is interconnected with frame 16 by a first portion 72 of frame 16, which is pivotally connected to a wheel frame 74 proximate hydraulic power unit 33 and also pivotally connected to respective brackets 76 that connect the first portion 72 to opposing sides of the outer staircase 50. The first hydraulic lift assembly 30 is further interconnected with frame 16 by a second portion 78 which is pivotally connected to a third portion 80 that is pivotally connected to respective brackets 82 that connect the third portion 80 to opposing sides of the outer staircase 50. One or more support posts 84 can be provided on the second portion 78. Each support post 84 extends perpendicularly away from the second portion 78 so that the third portion 80 engages each support post 84 when the staircase assembly 12 is in the transport arrangement of FIG. 8. Each support post 84 stabilizes and supports the staircase assembly 12 during transport and storage. In some embodiments, each support post 84 includes an L-shaped bracket 86, which receives the third portion 80 in the transport arrangement (see FIG. 9).

In the illustrated embodiment, although not referenced, each of the first, second and third portions 72, 78, 80 include one or more supports spanning first and second arms of the respective portion. The hydraulic cylinders 34 can be mounted to the third portion 80, between the respective arms of the third portion 80.

Figure 12:
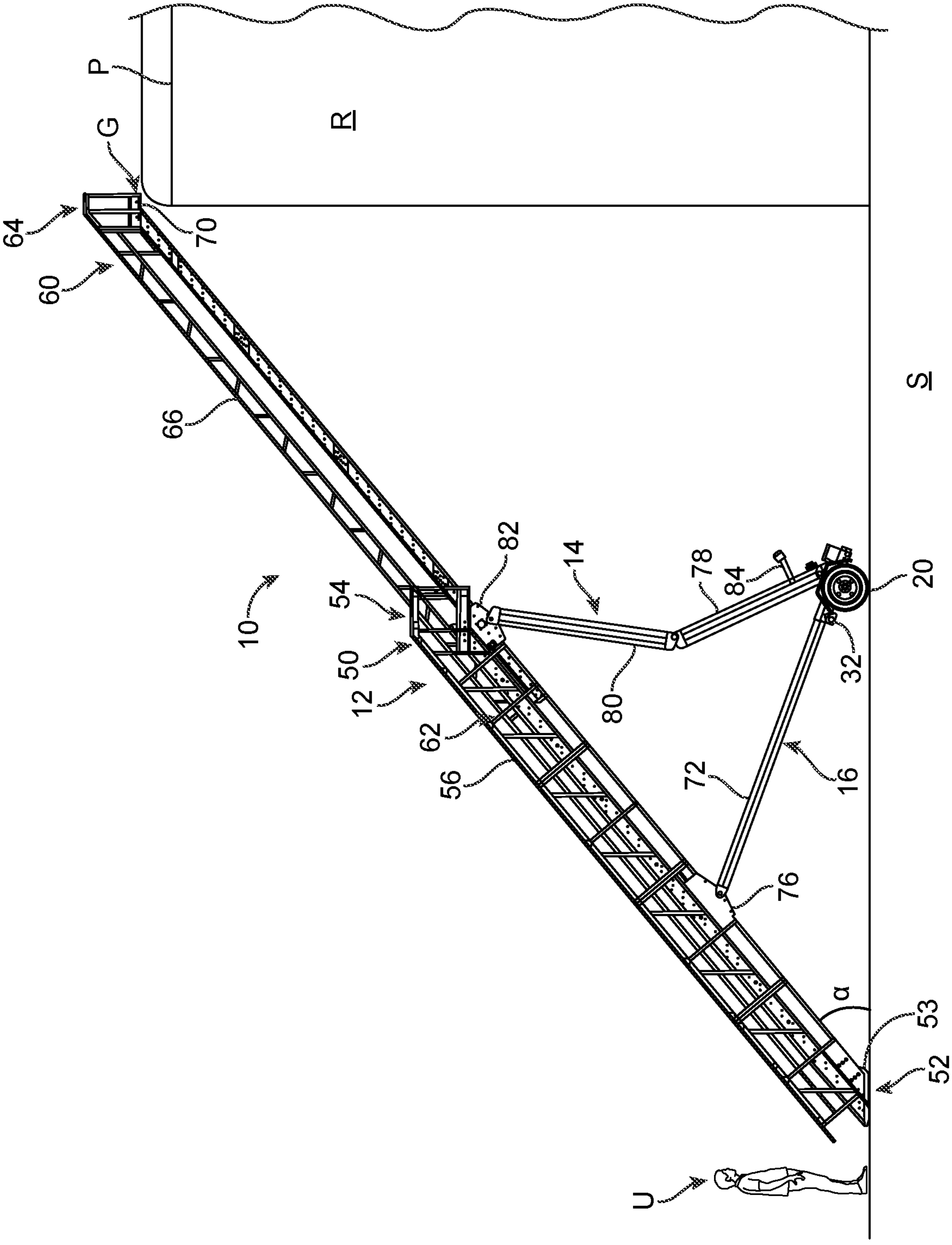
FIG. 12 is a side view of the portable staircase of FIG. 10 in the raised arrangement wherein the inner staircase is fully extended in an extended arrangement from the outer staircase positioned adjacent an oil drilling rig.
Figure 13:
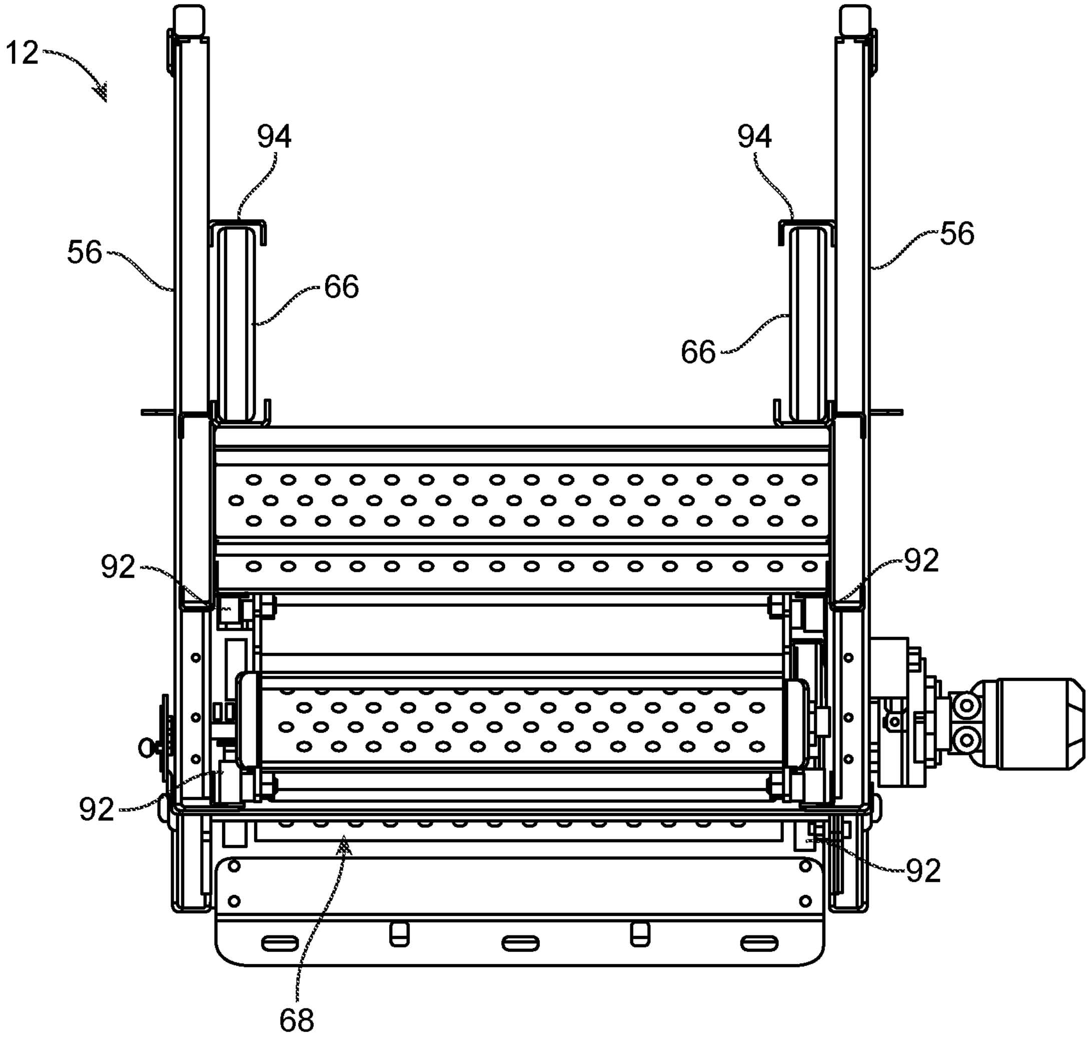
FIG. 13 is an end view of the staircase assembly.
Figure 14:
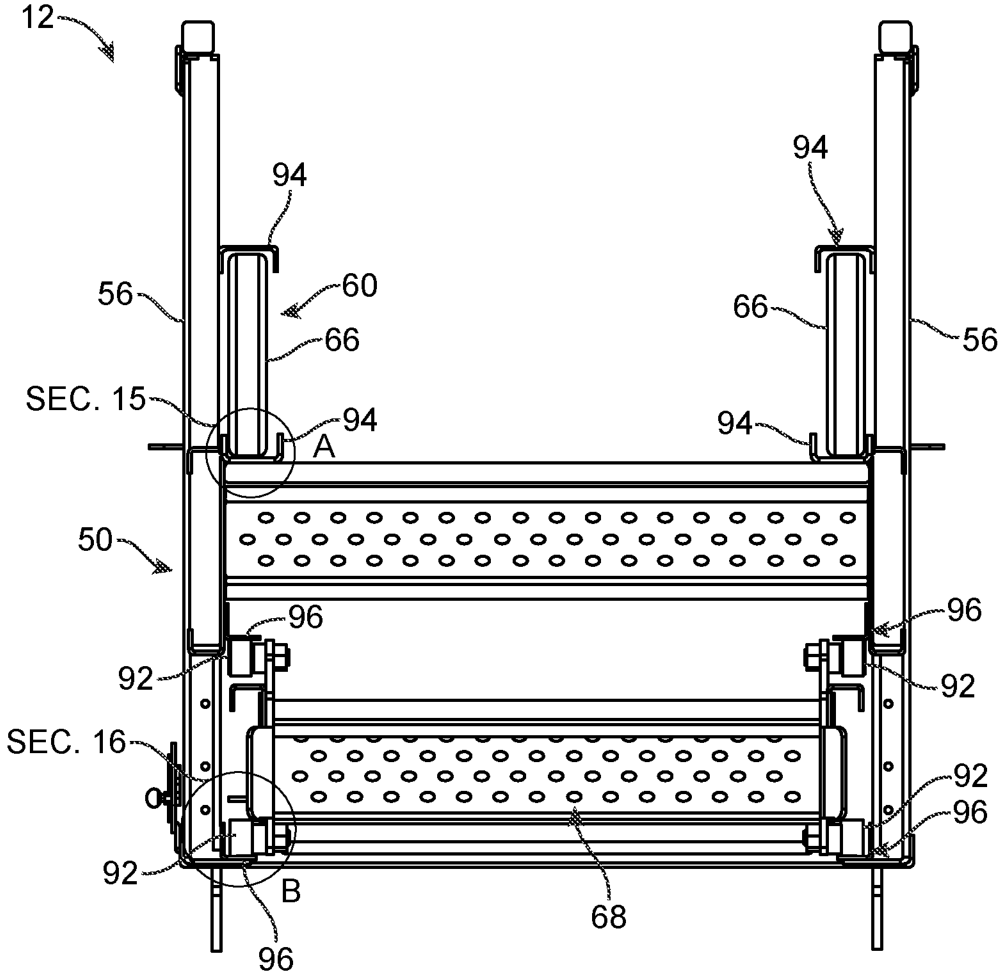
FIG. 14 is an end view of the staircase assembly having various elements omitted for clarity.
Figure 15:
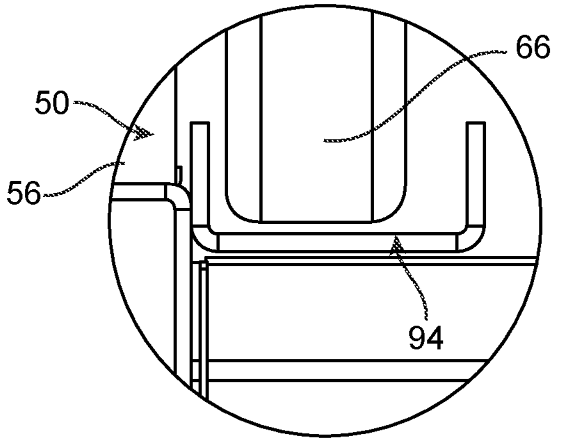
FIG. 15 is an enlarged view of SEC. 15 of FIG. 14.
Figure 16:
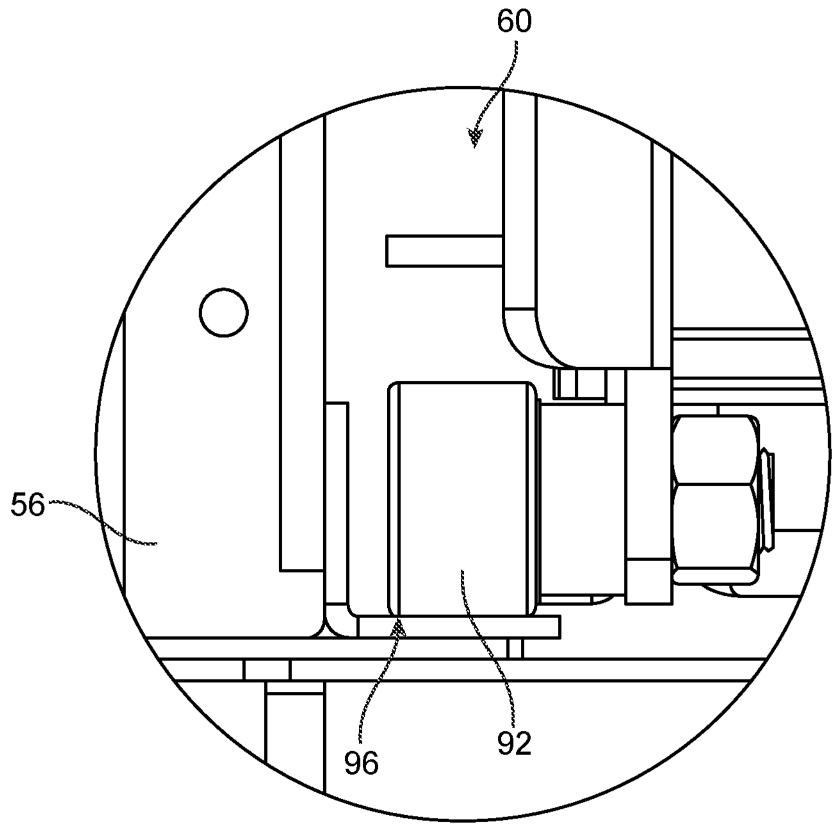
FIG. 16 is an enlarged view of SEC. 16 of FIG. 14.
Figure 17:
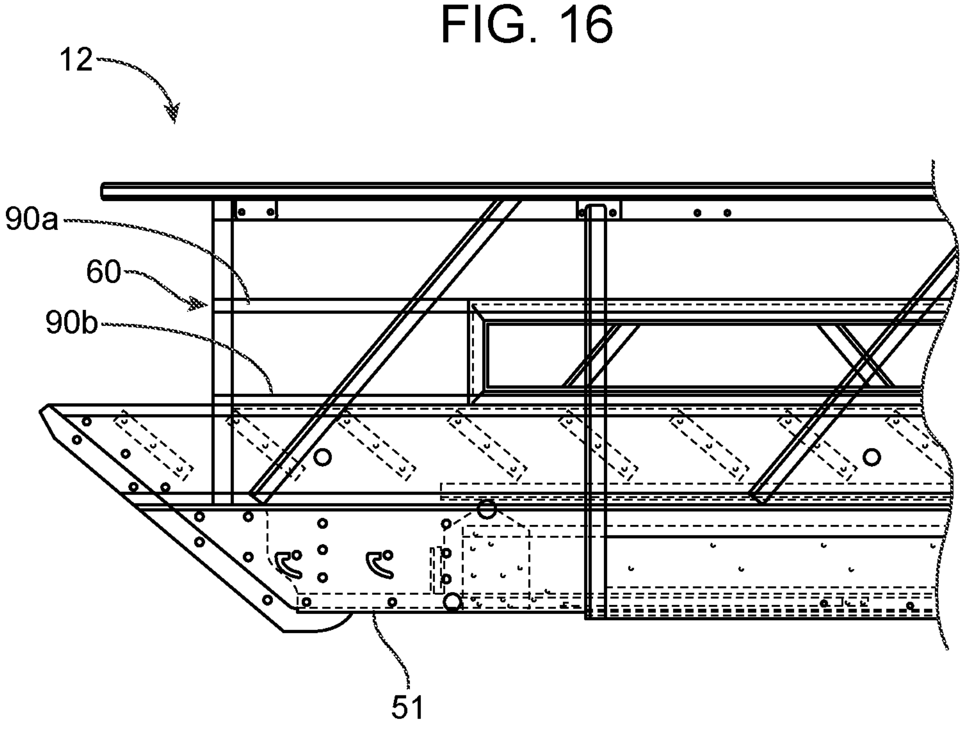
FIG. 17 is a partial, side view of the staircase assembly (the opposing side being identically configured).
Figure 18:
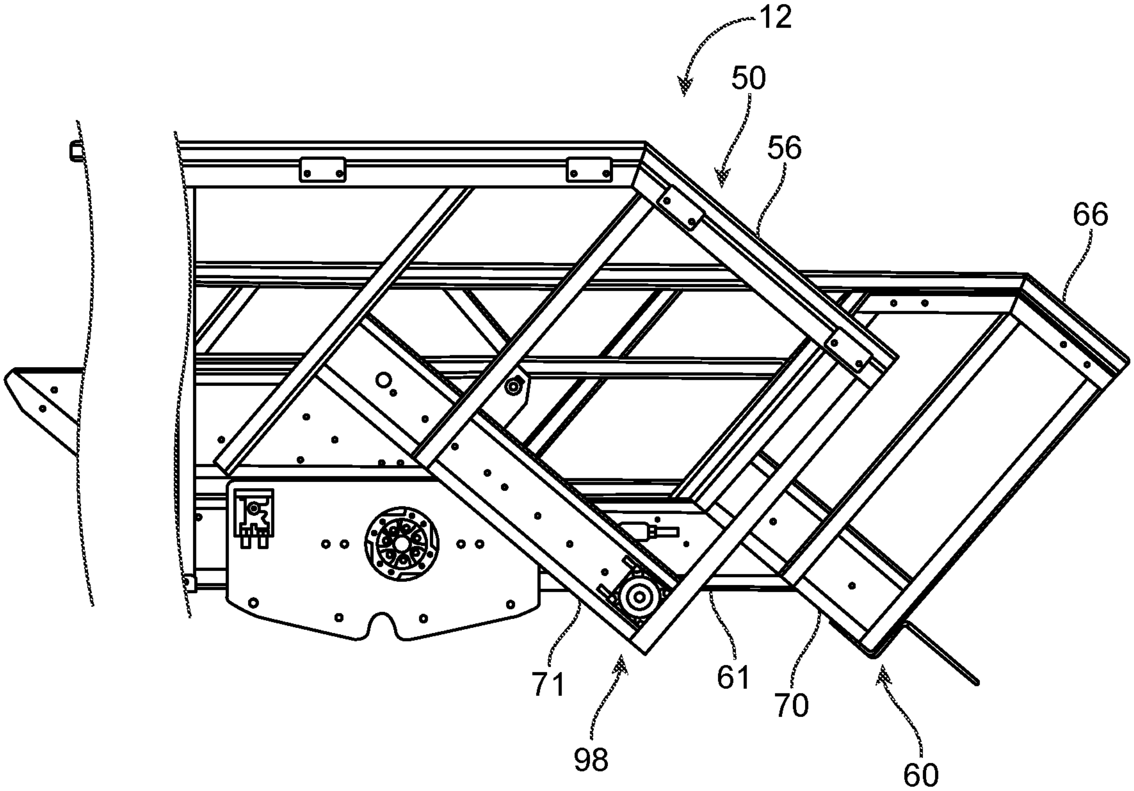
FIG. 18 is a partial, side view of the staircase assembly illustrating a roller on the outer staircase that support the inner staircase (the opposing side being identically configured).
Figure 19:
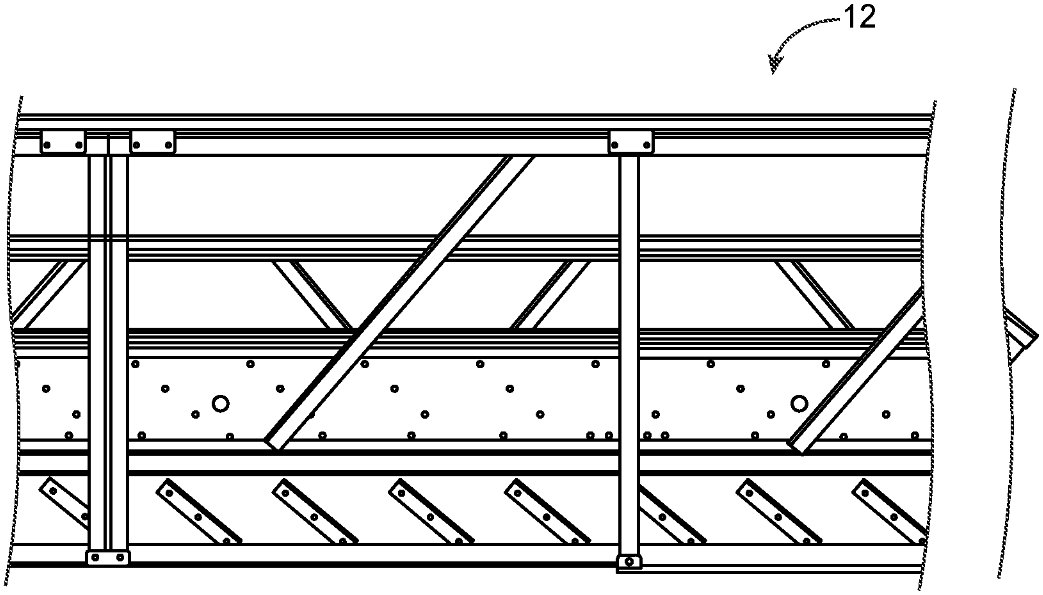
FIG. 19 is a partial, side view of the staircase assembly (the opposing side being identically configured).

One method of the disclosure includes providing a portable staircase 10 being any of the type disclosed herein. The portable staircase 10 is operatively hooked up with the hitch 15 to a vehicle and driven to the job site. In one embodiment, the job site is an oil drilling rig R (FIG. 12, schematically represented). Then, if necessary, the staircase assembly 12 angled with the first hydraulic lift assembly 30 to increase the angle α between the staircase assembly 12 and a surface S on which the portable staircase 10 is positioned. In one example, the staircase assembly 12 is positioned such that the second end 64 of the inner staircase 60 is adjacent, but not secured to, a platform P of the drilling rig R. To achieve this result, the inner staircase 60 may optionally be extended with the second hydraulic lift assembly 40 to be at least partially retracted from the outer staircase 50, thus extending an overall length of the staircase assembly 12. The inner staircase 60 can be fully extended or partially extended from the outer staircase 50, as desired. In this way, the portable staircase 10 provides a continuous length of stairs 58, 68 extending from the surface S to the platform P which terminates proximate the platform P but is independently supported with respect to the platform P. There may, however, be a gap G between the portable staircase 10 and the platform P as the portable staircase 10 is independently supported and need not rest against the platform P. In various methods, a user U walks from the surface S on which the portable staircase 10 is positioned, up the staircase assembly 12 and to the platform P of the drilling rig R. The user U steps from the staircase assembly 12 to the platform P to access the platform P from the surface S. It is envisioned that the portable staircase 10 can be used at other types of job sites, however, the benefits for use of the embodiments of the disclosure in conjunction with oil drilling rigs are believed to be particularly notable.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this invention be limited only by the claims and the equivalents thereof.

What is claimed is:

1. A portable staircase comprising:

a trailer having a frame, a plurality of wheels, and a wheel frame;

a staircase assembly secured to the frame, the staircase assembly including an outer staircase connected to the frame and an inner staircase mounted in a telescoping fashion with respect to the outer staircase; wherein the outer staircase includes a railing and the inner staircase includes a railing;

a first hydraulic lift assembly arranged and configured to vary an angle of the staircase assembly with respect to a surface on which the trailer is positioned; and a second hydraulic lift assembly arranged and configured to vary a position of the inner staircase with respect to the outer staircase;

wherein the first hydraulic lift assembly is interconnected with the frame and wherein the frame includes a first portion pivotally connected to the wheel frame and also pivotally connected to a first set of brackets that connect the first portion to opposing sides of the outer staircase, wherein the frame further includes a second portion pivotally connected to the first hydraulic lift assembly and also pivotally connected to a third portion that is pivotally connected to a second set of brackets that connect the third portion to opposing sides of the outer staircase; and the portable staircase further comprises a first support post provided on the second portion to extend perpendicularly away from the second portion so that the third portion can engage and disengage the first support post.

2. The portable staircase of claim 1, further comprising a second support post, in which each support post includes an L-shaped bracket, which receives the third portion in a transport arrangement.

3. The portable staircase of claim 1, wherein a hydraulic motor and brake controls movement of the inner staircase with respect to the outer staircase.

4. The portable staircase of claim 1, wherein the outer staircase includes at least one skid pad configured to stabilize the portable staircase on the surface.

5. The portable staircase of claim 1, wherein the inner staircase has a width that is less than a width of the outer staircase.

6. The portable staircase of claim 1, wherein the outer staircase includes a first track defining a C-shaped channel in which the inner staircase is configured to slide.

7. The portable staircase of claim 6, further comprising a second track that is L-shaped in which the inner staircase is configured to slide.

* * * * *